Figure 1:
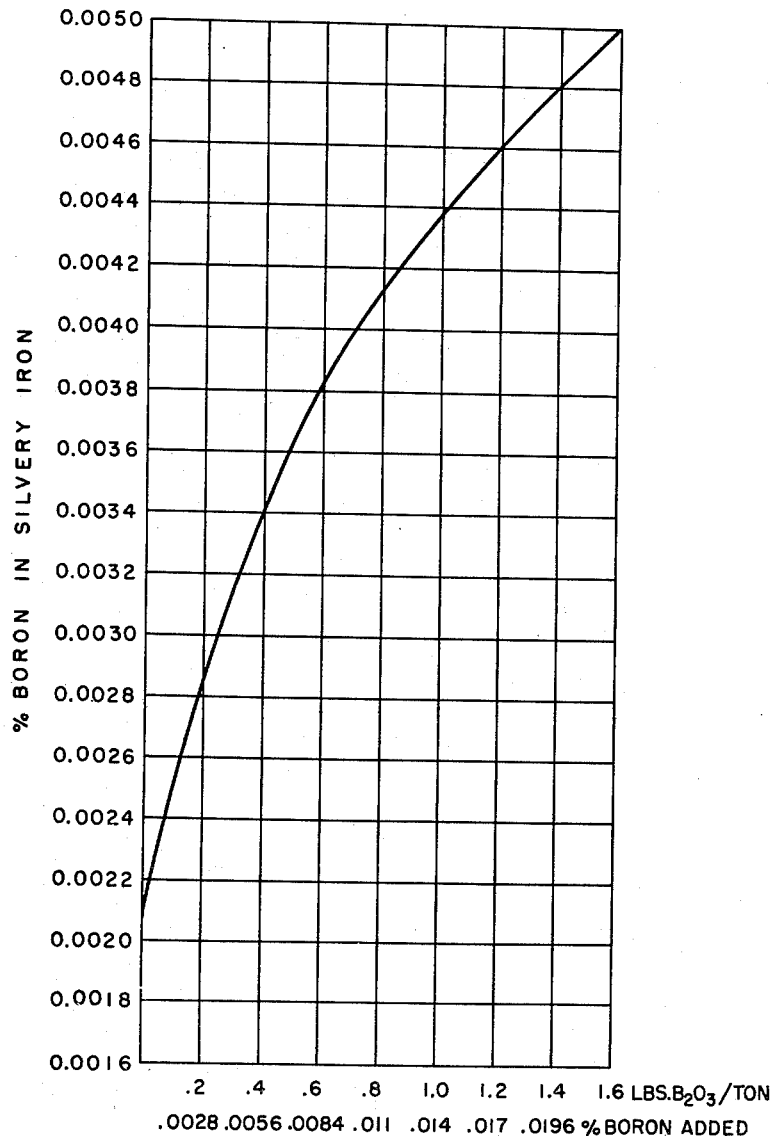

INVENTOR.
CLARENCE L. ALTENBURGER
BY Shanley & O'Neil
ATTORNEY

United States Patent Office 2,984,564
Patented May 16, 1961

2,984,564
METHOD OF MAKING PIG IRON AND PRODUCING MALLEABLE IRON

Clarence L. Altenburger, Dearborn, Mich., assignor to National Steel Corporation, a corporation of Delaware Filed Apr. 18, 1958, Ser. No. 729,344
29 Claims. (Cl. 75—130)

This invention relates to improvements in the composition of and in the method of making pig iron, and to improvements in the method of making white iron in the manufacture of malleable cast iron.

This application is a continuation-in-part of my copending application Serial No. 447,710 filed August 4, 1954 and entitled "Pig Iron Composition and Method of Making the Same and Method of Producing Malleable Iron," now abandoned.

In the production of malleable cast iron a melting furnace is employed which may comprise a cupola, an open hearth furnace, an air furnace or an electric arc furnace, or a combination of certain of these furnaces in a duplexing operation. The melting furnace is charged with a mixture of pig iron, steel scrap and bought scrap to produce a high-grade of white iron. The composition of the molten metal is carefully controlled so that decomposition of cementite in the white iron is entirely prevented and no graphite is formed. In addition to composition control, critical pouring temperatures and rates of cooling must be maintained so that upon casting the white iron no graphite flakes are produced yet the metal is such that it will readily malleabilize, that is, upon proper annealing treatment the cementite will decompose forming temper carbon in the form of approximately spherical nodules composed of extremely fine individual particles of carbon. It is the presence of the graphite in the form of small spherical nodules of temper carbon which provides the improved characteristics of malleable cast iron. This graphite structure is to be contrasted with the large number of interlocking graphite flakes in ordinary cast iron which produces its weak characteristics.

After the white iron has been poured into molds to form the castings, the castings are cooled and carefully cleaned and are then subjected to an annealing treatment which converts the white iron into malleable iron. In a typical annealing treatment the castings may be raised to a temperature of between 1600° and 1700° F. for a sufficient period of time so that all of the massive cementite is decomposed into temper carbon and iron. After this is accomplished a second annealing stage is required to decompose the remainder of the cementite. The temperature of the castings in the second stage may be between 1250° and 1300° F. Prior to recent developments, the time required for the annealing stages and for allowing the castings to cool to a handling temperature extended over a six-day period. This long annealing cycle accounted for the high cost of malleable iron castings, inasmuch as fuel costs are proportional to the period of the cycle and expensive equipment is utilized for long periods of time. For this reason considerable research has been directed toward the problem of reducing the annealing cycle of malleable cast iron.

One of the most important developments toward reducing the annealing cycle of malleable cast iron comprises the use of boron as an additive in the white iron castings to be malleablized. The boron allows complete decomposition of the cementite within a relatively short period of time, requiring an annealing cycle of only 28 hours or less while providing temper carbon nodules of proper size and number to maintain the desirable characteristics of malleable iron castings. It has been determined that the percentage of boron added to the white iron is critical. Should an insufficient quantity of boron be added, pearlite residues are present in the malleable castings following a relatively short annealing cycle and longer annealing treatment is required to produce an acceptable product. Also, should an excess of boron be added, a great profusion of nodules of temper carbon are formed which adversely affect the ductility of malleable iron. The proper percentage of boron varies to some extent according to composition of the white iron, the type of malleable iron required, the size and shape of the castings and upon the temperatures and period of the annealing cycle, and it has been found that the quantity of boron added to allow a short annealing cycle without adversely affecting characteristics of the malleable iron product may fall within a range from 0.00024 to 0.005 percent by weight, depending upon the foregoing variables.

Heretofore it has not been possible or practicable to add boron to white iron to be malleablized by employing oxygen-containing boron compounds such as $B_2O_3$, $H_3BO_3$, $Na_2B_4O_7.10H_2O$ or dehydrated $Na_2B_4O_7$, and relatively expensive ferroboron has been utilized for this purpose. On the present market ferroboron costs about $7 per pound of boron, as compared to $0.35 to $0.80 per pound of boron obtained from oxygen-containing boron compounds. Consequently, a process employing relatively inexpensive oxygen-containing boron compounds as a source of boron for accelerating malleable iron annealing cycles would materially reduce the boron cost.

In the prior practice, the ferroboron may be added to the molten white iron in the runner leading from the melting furnace to the molds forming the castings to be malleablized. In view of the minute quantities involved, this process does not provide a thorough mixing of the ferroboron in the molten metal and it is not possible to obtain a precise boron addition uniformly dispersed throughout the castings. In order to insure adequate boron additions, there is a tendency for operators to add excessive quantities of ferroboron to insure adequate malleablizing during a short annealing cycle. However, this practice is not only expensive but frequently results in production of poor quality castings due to inclusion of excessive quantities of boron.

It is, therefore, an object of the present invention to provide a novel method of producing malleable iron castings.

It is a further object of the present invention to provide a novel method of making white iron in the manufacture of malleable iron.

Another object is to provide a novel method of producing white iron in the manufacture of malleable iron of uniform characteristics in a short annealing cycle employing boron as an annealing accelerator in a highly economical manner and with greater accuracy than has been heretofore possible.

Another object is to provide a novel pig iron composition including specific percentages of boron.

Another object is to provide a novel method of producing a pig iron composition including specific percentages of boron.

Another object is to provide a novel method of producing a pig iron composition including specific percentages of boron by employing relatively low-cost oxygen-containing boron compounds as the source of boron.

Another object is to provide a novel method of producing a pig iron composition including specific percentages of boron by addition of a low-cost material comprising an oxygen-containing boron compound and a flux to the pig iron.

Still another object of the present invention is to provide a novel method of making white iron in malleable iron manufacture in which low-cost boron compounds provide boron to accelerate the annealing cycle.

Still another object of the present invention is to provide a novel method of making white iron in the manufacture of malleable iron in which a low-cost material comprising an oxygen-containing boron compound and a flux provide boron to accelerate the annealing cycle.

Still another object is to provide a novel method of producing white iron in the manufacture of malleable iron in which the charge to a melting furnace includes a quantity of novel pig iron composition having a percentage of boron as an additive and in which the percentage of boron in the pig iron is such that the percentage of boron in the white iron falls within desired limits for a particular grade of malleable iron being produced.

Other objects and features of the present invention will appear more fully below from the following detailed description considered in connection with the accompanying drawings which illustrate several features of the present invention. It is to be expressly understood, however, that the drawings are designed for purposes of illustration only and not as a definition of the limits of the invention, reference for the latter purpose being had to the appended claims.

Figure 2:
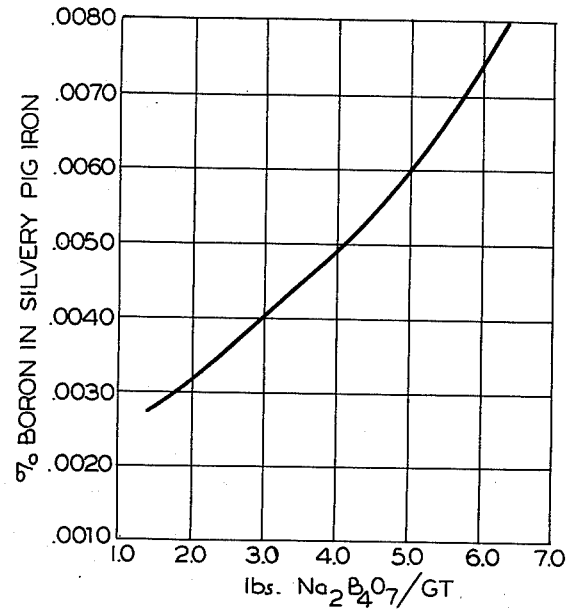
Figure 3:
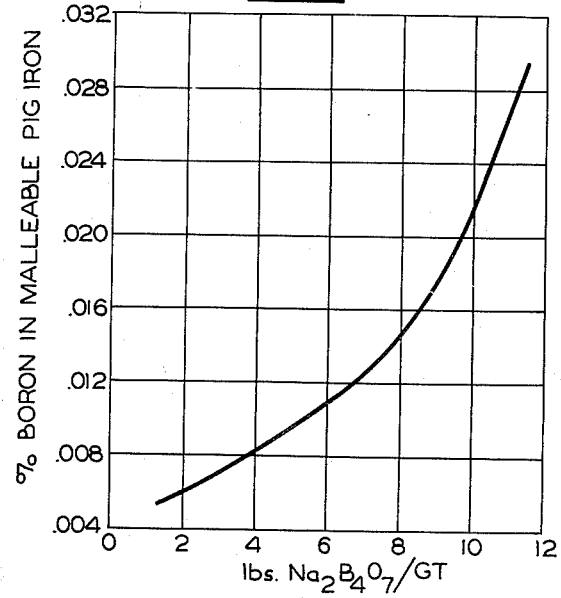

Figures 1 and 2 of the drawings are diagrammatic presentations illustrating the percentages of boron added to and retained in silvery pig iron upon various additions of $B_2O_3$ and $Na_2B_4O_7$ (Rasorite), respectively; while Figure 3 is a diagrammatic presentation illustrating the percentages of boron added to and retained in malleable pig iron upon various additions of $Na_2B_4O_7$ (Rasorite) to malleable pig iron.

The present invention provides a novel pig iron composition including a determinable percentage of boron which may vary throughout substantial limits. The novel pig iron may comprise the charge of a melting furnace in the production of malleable cast iron. It has been discovered that the boron additive in the pig iron persists through the melting furnace, which may comprise a single or a duplex operation, and that the boron is present in the white iron castings and functions as an annealing accelerator in much the same manner, but more efficiently, as boron when added to white iron utilizing ferroboron in accordance with prior practices.

Heretofore, probably at least in part because of the presence of oxygen and nitrogen in the molten metal, it was not thought possible to add boron to molten pig iron by introducing quantities of boron compounds, including ferroboron, to the metal without first blocking the charge and performing a substantially complete degasifying operation or by following other complicated and expensive processes. However, it has been discovered that pig iron having determinable percentages of boron may be produced by utilizing oxygen-containing boron compounds without following specialized processes. According to the present invention, pig iron having a determinable percentage of boron may be provided by either introducing a specific quantity of a boron-containing substance into the furnace charge producing molten pig iron, such as into a blast furnace or electric furnace charge, or by mixing a required amount of boron-containing substance with molten pig iron withdrawn from the furnace. It also is possible to impregnate a constituent of the furnace charge, such as coke in a blast furnace charge, with a required quantity of boron-containing substance or to introduce the boron-containing substance into the furnace through the tuyeres and obtain a pig iron product including a boron percentage that may be accurately predetermined. When it is desired to add boron to commercial pig iron, adequate quantities of boron-containing substance may be placed into the ladle receiving molten pig iron from the furnace or the substance may be introduced into the runner between the furnace and the ladle. In either case, the boron-containing substance is thoroughly mixed in the molten metal in the ladle and a uniform distribution of boron is obtained.

Figure 1 of the drawing illustrates the percentage by weight of boron retained in silvery pig iron for various additions of $B_2O_3$ to silvery pig iron. In this illustration, the quantity of $B_2O_3$ in pounds added per ton of silvery pig iron, as well as the percent of boron added for a given addition of the compound, is plotted along the abscissa, while the ordinate is a measure of the percentages of boron retained in the silvery pig iron. The curve showing the relationship between added $B_2O_3$ and retained boron represents an average of a number of runs in which the percentage of boron present in the silvery pig iron following known additions of $B_2O_3$ was determined by spectroscopic analysis. The lower end of the curve initiates on the abscissa corresponding to zero $B_2O_3$ addition, and on an ordinate indicating 0.0021 percent boron in the silvery pig iron. The latter percentage of boron represents the average boron inherently present in the silvery pig iron analyzed during a series of tests resulting from traces of boron in the constituents of the blast furnace charge. According to this curve, only a portion of the added boron is retained in the silvery pig iron, and the percentage of retained boron decreases as the boron is added in larger quantities. It has been found that the boron losses can be predetermined and thus provide an aid in accurately adding minute boron quantities as required for annealing accelerators to a degree unattainable by the prior processes. Although the boron losses may comprise a relatively high percentage of the added boron, the process remains economically advantageous in view of the relatively high cost of ferroboron required in the prior processes.

Figures 2 and 3 of the drawings illustrate the percentage by weight of boron retained in silvery pig iron and malleable pig iron, respectively, for various additions of $Na_2B_4O_7$ (Rasorite) to the silvery and malleable pig iron. In these illustrations, the quantities in pounds of $Na_2B_4O_7$ contained in the Rasorite added to the pig iron are plotted along the abscissae, while the ordinates are a measure of the percentages of boron retained in the pig iron. In each instance, the curves showing the relationship between added $Na_2B_4O_7$ and retained boron represent the results of a number or runs in which the percentage of boron present in the pig iron, following known additions of $Na_2B_4O_7$, was determined by spectroscopic analysis. According to these curves, only a portion of the boron content of the added $Na_2B_4O_7$ is retained in the pig iron, as was true of added $B_2O_3$. However, if the two curves are compared, it may be seen that a considerably larger percentage of boron for a given amount of added $Na_2B_4O_7$ is retained in malleable pig iron than in silvery pig iron. In most instances, at least about 50% more boron is retained in malleable pig iron than in silvery pig iron.

The reasons why boron may be added to pig iron by utilizing relatively inexpensive oxygen-containing boron compounds in the above manner is not known. One possible factor involved may be the reducing characteristics of silicon which may comprise from about 1.25 to 2.25 percent of the composition of malleable pig iron, from about 6.00 to 17.00 percent of the composition of silvery pig iron, and up to about 90% of the composition of ferrosilicon. It is believed that the following reaction may take place upon adding boron oxide to silicon-containing pig iron such as silvery pig iron, either as a constituent of the furnace charge or as an additive to the metal withdrawn from the furnace:

$$3Si + 2B_2O_3 = 3SiO_2 + 4B$$

In this reaction, three molecules of silicon in the pig iron react with the oxygen in the boron oxide producing three molecules of silicon oxide and four molecules of free boron. The silicon dioxide collects in the slag and is removed from the molten metal therewith, while the boron either dissolves in the molten pig iron as free boron or is present therein as complex boron compounds. Still another possible factor involved may be the reducing characteristics of carbon which may comprise from about 0.75 to 1.0 percent and from about 3.75 to 4.30 percent of the compositions of silvery and malleable pig iron, respectively. It is believed that a reaction which may be somewhat similar to that given above for silicon may take place between the carbon and the boron-containing substance, particularly when low percentages of silicon are present, to produce gaseous oxides of carbon and reduced boron or free boron. It also may be that the silicon and carbon are each partially responsible for reduction of the boron, or that each aid in some manner in reduction of the boron, or that the manner in which the boron is reduced is dependent at least to some extent upon the relative amounts of silicon and carbon present and/or the amount of boron-containing substance which is added. For example, where the boron-containing substance is added to pig iron relatively high in silicon content, such as silvery pig iron, silicon may be largely responsible for reduction of the boron; while in instances where the boron-containing substance is added to pig iron relatively low in silicon content, such as malleable pig iron, carbon may be at least partially responsible for reduction of the boron. In addition, the silicon and carbon also may be responsible for the boron being maintained in the reduced state throughout the subsequent melting furnace operation to produce white iron. In any event, with respect to the reduced boron, it persists throughout the melting furnace operation and functions as an annealing accelerator and it is not necessary to know how it is reduced or its chemical form in the pig iron in order to practice the present invention.

The present invention may be practiced by employing a wide variety of oxygen- and boron-containing substances as the source of boron. Examples of suitable sources of boron include such oxygen-containing boron compounds as oxides of boron, alkali and alkaline earth metaborates or tetraborates, etc. Specific examples of oxygen-containing boron compounds include Rasorite, $H_3BO_3$, $B_2O_3$, $Na_2B_2O_4$, $Na_2B_4O_7$, and hydrates of these compounds. Usually, a compound containing both boron and sodium is preferred since the sodium content of the compound serves as a fluxing agent, as will be discussed more fully hereinafter. Of the above named substances, Rasorite is presently preferred. This naturally occurring mineral, which is sometimes known as Kernite, has the following composition when anhydrous:

| | Percent |
|---|---|
| $Na_2O$ | 28.0 |
| $B_2O_3$ | 61.5 |
| $H_2O$ | 0.4 |
| Minor constituents | 9.8 |
| Equivalent anhyrous borax | 89.09 |

The minor constituents, contained in the gangue of the natural ore, are typically as follows:

| | Percent | | Percent |
|---|---|---|---|
| $SiO_2$ | 5.2 | CaO | 0.8 |
| $Fe_2O_3$ | 0.4 | MgO | 1.4 |
| $Al_2O_3$ | 1.7 | $SO_3$ | 0.3 |

The oxygen- and boron-containing substances preferably should be in a finely divided state when added to molten pig iron and, when added to the runner, the addition preferably should be complete by the time ladle is about two-thirds to three-quarters full. This procedure assures intimate contact between the additive and the molten pig iron. When the additive is Rasorite, the following state of subdivision has been found to be very satisfactory:

| U.S. Standard Sieve No. | Percent Cumulative |
|---|---|
| 12 | 1 |
| 16 | 13 |
| 20 | 32 |
| 30 | 53 |
| 40 | 69 |
| 50 | 83 |
| 70 | 91 |
| 100 | 95 |
| 200 | 99 |
| —200 | 1 |

The quantity of boron-containing substance to be added to pig iron will vary over a wide range depending upon the composition of the pig iron, the amount of boron desired in the pig iron, the point of addition, the nature of the specific added substance, etc. Where the pig iron is silvery pig iron or malleable pig iron and the additive is $Na_2B_4O_7$ (Rasorite) or $B_2O_3$, then the drawings may be referred to in order to determine the quantity necessary to provide a certain boron content. In general, for a given pig iron, the quantities of $B_2O_3$, $Na_2B_4O_7$, $Na_2B_4O_7 \cdot 10H_2O$, etc., required to produce the same percentage of boron in the pig iron will depend on the weight of boron in the weight of substance added. For example, the approximate quantities of boron-containing compounds required to provide 0.005 percent boron in one ton of the silvery pig iron of Figure 1 are about: 2.30 pounds of $Na_2B_4O_7$; 2.83 pounds of $H_3BO_3$ and 4.36 pounds of $Na_2B_4O_7 \cdot 10H_2O$.

It has been noted that often a substantially larger percentage of added boron is retained by malleable pig iron than silvery pig iron. While the reason for this is not fully understood at the present time, it is believed that the higher silicon content of silvery pig iron may oxidize in relatively larger quantities to produce a silicon dioxide layer on the silvery pig iron. The silicon dioxide layer thus produced then acts as a barrier to the reduction of the added boron-containing compound and thereby reduces the percentage of retained boron. The malleable pig iron, due to its lower silicon content, appears to undergo relatively little oxidation of silicon to silicon dioxide. Thus, a thinner layer of silicon dioxide is formed on malleable pig iron which is less effective as a barrier and which allows a larger percentage of the boron to be reduced and retained. This is true even though the higher silicon content of the silvery pig iron would appear to favor the reduction and retention of a larger percentage of the boron-containing compound.

In accordance with one very important feature of the present invention, the above described difficulty may be overcome by adding a material comprising an oxygen-containing boron compound and a fluxing agent to the pig iron. Such additive materials include single oxygen-containing boron compounds which also include a fluxing agent, as well as mixtures including an oxygen-containing boron compound and one or more substances which act as a fluxing agent. Specific examples of single oxygen-containing boron compounds which also comprise a fluxing agent include the alkali and alkaline earth metaborates and tetraborates such as $Na_2B_2O_4$ and $Na_2B_4O_7$. Specific examples of fluxing agents to be mixed with an oxygen-containing boron compound and the mixture added to the pig iron, or the pig iron otherwise treated with both the flux and oxygen-containing boron compound, include sodium chloride, calcium chloride, fluorspar, lime, soda ash and magnesite. If desired, mixtures of the above fluxing agents may be used, or one or more of the above fluxing agents may be added to the above described compounds of boron which also contain a fluxing agent, such as $Na_2B_4O_7$. The amount of fluxing agent to be added to or along with the boron compound may vary over wide ranges. Usually, good results are obtained when the fluxing agent is present in amounts from about one-half to equal quantities, based on the weight of boron compound. However, the fluxing agent may be present in amounts much smaller or larger than this in many instances, and often larger amounts give improved results from the standpoint of boron recovery. The additive materials which include an oxygen-containing boron compound and a fluxing agent often may result in damage to the furnace lining if substances such as sodium are present and, for this reason, it may be preferred to make the addition to the runner or ladle. Wherever the addition is made, the use of a fluxing agent in combination with the boron compound overcomes the above described difficulties which are apparently due to a barrier layer of silicon dioxide and the result is a marked increase in the percentage of added boron retained by the pig iron.

As mentioned above, the present invention provides a novel method for producing short-cycle malleable iron utilizing boron as an annealing accelerator. According to this method a pig iron composition having a critical boron content comprises a portion of the charge of a melting furnace producing the white iron to be malleablized, with the percentage of boron in the pig iron and the percentage of the pig iron in the charge being adjusted to provide the required boron percentage in the white iron. This method not only allows the use of relatively inexpensive oxygen- and boron-containing substances as a source of boron, but also makes it possible to accurately control the extremely small percentages of boron required in the white iron castings. Malleable iron producers may utilize a melting furnace charge including from 5.0 to 15.0 percent silvery pig iron, although in the more accepted practice the silvery pig iron may comprise from 7.0 to 13.0 percent of the charge. Thus, the present invention contemplates the production of silvery pig iron including from about 0.0024 to 0.1 percent boron to provide from about 0.00024 to 0.005 percent boron in the castings with the silvery pig iron comprising from 5.0 to 15.0 percent of the charge. For the more accepted practice of melting furnace charges including from about 7.0 to 13.0 percent silvery pig iron, the present invention provides silvery pig iron having from about 0.0036 to 0.05 percent boron. It is thus apparent that the accuracy of the boron addition in the white iron castings may be increased over that obtained by prior practices by a factor proportional to the percentage of silvery pig iron in the melting furnace charge. This improved performance results from the discovery that boron in silvery pig iron persists throughout the melting furnace operation, whether a single or a duplex performance, and that the boron is in the white iron casting to accelerate the annealing cycle even though the boron may be present in the silvery pig iron and in the white iron as free boron or in the form of complex compounds. Furthermore, the boron losses discussed above also aid in obtaining accurate boron additions in the castings. Thus, with reference to Figure 1 of the drawing, one pound of boron oxide added to each ton of silvery pig iron making up 10.0 percent of the melting furnace charge will provide 0.00024 percent boron in the white iron castings. In addition, the boron is uniformly dispersed throughout the castings, thereby increasing the quality of the product.

Malleable iron producers also may utilize a melting furnace charge including malleable pig iron or pig iron having a very high silicon content such as a silicon content of up to about 90% by weight. A melting furnace charge usually includes from about 35 to 55 percent malleable pig iron, but a lower or higher percentage may be used in some instances. Thus, the present invention contemplates the production of malleable pig iron including from about 0.0012 to 0.05% boron to provide from about 0.00024 to 0.005 percent boron in the castings when the malleable pig iron comprises 35 to 55 percent of the melting furnace charge. In instances where the malleable pig iron constitutes about 40 to 50 percent of the melting furnace charge, malleable pig iron containing from about 0.0012 to 0.015 percent boron is usually preferred.

If desired, a combination of malleable pig iron, silvery pig iron or pig iron having a silicon content of up to about 90% may be used in the melting furnace charge provided the proper proportions are used to give the desired composition and properties in the resulting white iron. Also, the boron content of pig iron produced in accordance with the present invention may be substantially higher than mentioned above and thus only a portion of the normal amount of pig iron charged to the furnace need contain boron, this portion having a sufficiently high boron content to provide from about 0.00024 to 0.005 percent boron in the white iron. Where the pig iron contains a very high silicon content, then the boron content should be sufficiently high to provide a white iron composition comprising from about 0.06 to 1.15 percent silicon and from about 0.00024 to 0.005 percent boron. Also, the pig iron should contain not less than 0.0012 percent boron at silicon contents below about 6.00 percent, and not less than 0.0024 percent boron at higher silicon contents than 6.00 percent.

There have been attempts to provide boron as an annealing accelerator by adding relatively cheap oxygen-containing boron compounds directly to white iron in the runner leading to the molds in a manner similar to the conventional practice utilizing ferroboron. The total failure of such a process is probably due to certain inherent difficulties which are eliminated by the present invention. It was found that in order to obtain a sufficient percentage or boron in the white iron castings, such a large quantity of oxygen-containing boron compound was required to be added that the product was unusable due to resulting impurities and that the process was more expensive than when employing ferroboron. This practice was not only uneconomic but, even more important, the reduction of boron compounds when added directly to white iron produces $SiO_2$ which combines with unreduced oxides of boron to produce glasses of high viscosity and of variable composition. In practicing the present invention, such impurities are removed from the pig iron with the slag.

The relationship between the percentage of boron added to silvery pig iron and the percentage of boron resulting in the silvery pig iron is illustrated by the curve shown in Figure 1 of the drawing. This curve was obtained by plotting data resulting from analysis of a number of runs of silvery pig iron destined to constitute 10 percent of the charge of a melting furnace producing white iron for subsequent malleabilizing, the silvery pig iron including about 10 percent silicon. It was found that the silvery pig iron including from 0.0024 to 0.0036 percent boron, when constituting 10 percent of the charge of the melting furnace, provided adequate boron content in the castings in some cases and inadequate boron content in other cases, depending upon the composition of the white iron, the size and shape of the castings, the period of the annealing cycle and the annealing temperatures. It was also found that silvery pig iron including from 0.0036 to 0.005 percent boron provided boron percentage in the white iron which resulted in pearlite-free castings for a wide range of white iron compositions, sizes and shapes of castings and annealing periods and temperatures.

The terms silvery pig iron and malleable pig iron employed herein refer to pig iron of high silicon content and relatively low silicon content, respectively, and the terms are well understood in the art. Silvery pig iron and malleable pig iron are generally produced by a blast furnace operation, but may be made in an electric furnace provided with a charge of proper composition. The maximum ranges of the principal constituents of silvery pig iron and malleable pig iron are set forth on page 284 of "The Making, Shaping and Treating of Steel," 6th edition, published by The United States Steel Company, as follows:

*Silvery pig iron*

Silicon 6.00 to 17.00 percent.
Sulphur under 0.05 percent.
Phosphorus 0.10 to 0.40 percent.
Manganese 0.30 to 2.00 percent.
Carbon 0.75 to 1.0 percent (carbon not specified).
Balance iron.

*Malleable pig iron*

Silicon 1.25 to 2.25 percent.
Sulphur under 0.05 percent.
Phosphorus 0.1 to 0.19 percent.
Manganese 0.4 to 1.00 percent.
Carbon 3.75 to 4.30 percent (not to be specified).
Balance iron.

Pig iron of very high silicon content, such as ferrosilicon containing up to about 90% silicon, may be made in an electrical furnace provided with a charge of proper composition by well known processes.

There is thus provided by the present invention a novel process for producing short cycle malleable iron. The process utilizes boron as an annealing accelerator but provides an improved control over the critical percentage of boron in the white iron castings and a more thorough dispersal of the boron throughout the castings, thereby resulting in a more uniformly annealed product. These advantages are achieved by providing a novel pig iron composition, including a controlled percentage of added boron, which makes up a portion of the charge to the melting furnace producing the white iron to be malleablized. The boron is uniformly dispersed in the pig iron and more precise control over the boron percentage in the white iron is obtained due to, in part, larger quantities of boron-containing substance being handled when adding the boron to the pig iron and more accurately determinable boron losses. The boron is added to the pig iron by a novel process utilizing relatively inexpensive oxygen-containing boron compounds and the cost of malleable iron is reduced since expensive ferroboron is not required as is the case when following prior practices. The present invention, therefore, also provides a novel pig iron composition and a method of making the same.

What is claimed is:

1. The method of making white iron in the manufacture of malleable iron which comprises melting a charge including scrap and pig iron containing about 1.25 to 17% by weight of silicon to produce white iron, at least a portion of the pig iron also containing a minor amount not less than .0012% by weight of boron and sufficient boron to provide from about .00024 to .005% by weight of boron in the white iron.

2. The method of making white iron in the manufacture of malleable iron which comprises melting a charge including silvery pig iron and scrap to produce white iron, at least a portion of the silvery pig iron containing a minor amount not less than .0024% by weight of boron and sufficient boron to provide from about .00024 to .005% by weight of boron in the white iron.

3. The method of making white iron in the manufacture of malleable iron which comprises melting a charge including silvery pig iron and scrap to produce white iron, the silvery pig iron comprising about 5 to 15% by weight of the charge and at least a portion of the silvery pig iron containing from about .0024 to .1% by weight of boron and sufficient boron to provide from about 0.00024 to .005% by weight of boron in the white iron.

4. The method of making white iron in the manufacture of malleable iron which comprises melting a charge including malleable pig iron and scrap to produce white iron, at least a portion of the malleable pig iron containing a minor amount not less than .0012% by weight of boron and sufficient boron to provide from about .00024 to .005% by weight of boron in the white iron.

5. The method of making white iron in the manufacture of malleable iron which comprises melting a charge including malleable pig iron and scrap to produce white iron, the malleable pig iron comprising about 35 to 55% by weight of the charge and at least a portion of the malleable pig iron containing from about .0012 to .05% by weight of boron and sufficient boron to provide from about .00024 to .005% by weight of boron in the white iron.

6. The method of making white iron in the manufacture of malleable iron which comprises melting a charge including silvery pig iron and scrap to produce white iron, at least a portion of the silvery pig iron containing a minor amount not less than .0024% by weight of boron and sufficient boron to provide from about .00024 to .005% by weight of boron in white iron, the boron content of the silvery pig iron being obtained at least in part by the addition of a material comprising an oxygen-containing boron compound.

7. The method of making white iron in the manufacture of malleable iron which comprises melting a charge including silvery pig iron and scrap to produce white iron, the silvery pig iron comprising about 5 to 15% by weight of the charge and at least a portion of the silvery pig iron containing from about 0.0024 to 0.1% by weight of boron and sufficient boron to provide from about 0.00024 to 0.005% by weight of boron in the white iron, the boron content of the silvery pig iron being obtained at least in part by the addition of a material comprising an oxygen-containing boron compound.

8. The method of making white iron in the manufacture of malleable iron which comprises melting a charge including malleable pig iron and scrap to produce white iron, at least a portion of the malleable pig iron containing a minor amount not less than 0.0012% by weight of boron and sufficient boron to provide from about 0.00024 to 0.005% by weight of boron in the white iron, the boron content of the malleable pig iron being obtained at least in part by the addition of a material comprising an oxygen-containing boron compound.

9. The method of making white iron in the manufacture of malleable iron which comprises melting a charge including malleable pig iron and scrap to produce white iron, the malleable pig iron comprising about 35 to 55% by weight of the charge and at least a portion of the malleable pig iron containing from about 0.0012 to 0.05% by weight of boron and sufficient boron to provide from about 0.00024 to 0.005% by weight of boron in the white iron, the boron content of the malleable pig iron being obtained at least in part by the addition of a material comprising an oxygen-containing boron compound.

10. The method of making white iron in the manufacture of malleable iron which comprises melting a charge including silvery pig iron and scrap to produce white iron, at least a portion of the silvery pig iron containing a minor amount not less than 0.0024% by weight of boron and sufficient boron to provide from about 0.00024 to 0.005% by weight of boron in white iron, the boron content of the silvery pig iron being obtained at least in part by the addition of a material comprising an oxygen-containing boron compound and a fluxing agent.

11. The method of making white iron in the manufacture of malleable iron which comprises melting a charge including silvery pig iron and scrap to produce white iron, the silvery pig iron comprising about 5 to 15% by weight of the charge and at least a portion of the silvery pig iron containing from about 0.0024 to 0.1% by weight of boron and sufficient boron to provide from about 0.00024 to 0.005% by weight of boron in the white iron, the boron content of the silvery pig iron being obtained at least in part by the addition of a material comprising an oxygen-containing boron compound and a fluxing agent.

12. The method of making white iron in the manufacture of malleable iron which comprises melting a charge including malleable pig iron and scrap to produce white iron, at least a portion of the malleable pig iron containing a minor amount not less than 0.0012% by weight of boron and sufficient boron to provide from about 0.00024 to 0.005% by weight of boron in the white iron, the boron content of the malleable pig iron being obtained at least in part by the addition of a material comprising an oxygen-containing boron compound and a fluxing agent.

13. The method of making white iron in the manufacture of malleable iron which comprises melting a charge including malleable pig iron and scrap to produce white iron, the malleable pig iron comprising about 35 to 55% by weight of the charge and at least a portion of the malleable pig iron containing from about 0.0012 to 0.05% by weight of boron and sufficient boron to provide from about 0.00024 to 0.005% by weight of boron in the white iron, the boron content of the malleable pig iron being obtained at least in part by the addition of a material comprising an oxygen-containing boron compound and a fluxing agent.

14. The method of making white iron in the manufacture of malleable iron which comprises melting a charge including silvery pig iron and scrap to produce white iron, at least a portion of the silvery pig iron containing a minor amount not less than 0.0024% by weight of boron and sufficient boron to provide from about 0.00024 to 0.005% by weight of boron in the white iron, the boron content of the silvery pig iron being obtained at least in part by the addition of an oxygen- and boron-containing substance selected from the group consisting of Rasorite, $H_3BO_3$, $B_2O_3$, $Na_2B_2O_4$, $Na_2B_4O_7$, and hydrates thereof.

15. The method of making white iron in the manufacture of malleable iron which comprises melting a charge including silvery pig iron and scrap to produce white iron, the silvery pig iron comprising about 5 to 15% by weight of the charge and at least a portion of the silvery pig iron containing from about 0.0024 to 0.1% by weight of boron and sufficient boron to provide from about 0.00024 to 0.005% by weight of boron in the white iron, the boron content of the silvery pig iron being obtained at least in part by the addition of an oxygen- and boron-containing substance selected from the group consisting of Rasorite, $H_3BO_3$, $B_2O_3$, $Na_2B_2O_4$, $Na_2B_4O_7$, and hydrates thereof.

16. The method of making white iron in the manufacture of malleable iron which comprises melting a charge including malleable pig iron and scrap to produce white iron, at least a portion of the malleable pig iron containing a minor amount not less than 0.0012% by weight of boron and sufficient boron to provide from about 0.00024 to 0.005% by weight of boron in the white iron, the boron content of the malleable pig iron being obtained at least in part by the addition of an oxygen- and boron-containing substance selected from the group consisting of Rasorite, $H_3BO_3$, $B_2O_3$, $Na_2B_2O_4$, $Na_2B_4O_7$, and hydrates thereof.

17. The method of making white iron in the manufacture of malleable iron which comprises melting a charge including malleable pig iron and scrap to produce white iron, the malleable pig iron comprising about 35 to 55% by weight of the charge and at least a portion of the malleable pig iron containing from about 0.0012 to 0.05% by weight of boron and sufficient boron to provide from about 0.00024 to 0.005% by weight of boron in the white iron, the boron content of the malleable pig iron being obtained at least in part by the addition of an oxygen- and boron-containing substance selected from the group consisting of Rasorite, $H_3BO_3$, $B_2O_3$, $Na_2B_2O_4$, $Na_2B_4O_7$, and hydrates thereof.

18. The method of making silvery pig iron containing about 6 to 17% by weight of silicon, from about 0.0024 to 0.1% by weight of boron and the balance substantially iron and incidental impurities, comprising the steps of placing a charge of proper composition in a furnace, operating the furnace to produce molten silvery pig iron containing about 6 to 17% by weight of silicon, withdrawing molten silvery pig iron, and adding to the withdrawn molten silvery pig iron an oxygen-containing boron compound in a quantity to provide from about 0.0024 to 0.1% by weight of boron in the silvery pig iron product.

19. The method of making malleable pig iron containing about 1.25 to 2.25% by weight of silicon, a minor amount not less than about 0.0012% by weight of boron, and the balance substantially iron and incidental impurities, comprising the steps of placing a charge of proper composition in a furnace, operating the furnace to produce molten malleable pig iron containing about 1.25 to 2.25% by weight of silicon, withdrawing molten malleable pig iron, and adding to the withdrawn molten malleable pig iron an oxygen-containing boron compound in a quantity to provide a minor amount not less than 0.0012% by weight of boron in the malleable pig iron product.

20. The method of making malleable pig iron containing about 1.25 to 2.25% by weight of silicon, from about 0.0012 to 0.05% by weight of boron, and the balance substantially iron and incidental impurities, comprising the steps of placing a charge of proper composition in a furnace, operating the furnace to produce molten malleable pig iron containing from about 1.25 to 2.25% by weight of silicon, withdrawing molten malleable pig iron, and adding to the withdrawn malleable pig iron an oxygen-containing boron compound in a quantity to provide about 0.0012 to 0.05% by weight of boron in the malleable pig iron product.

21. The method of making silvery pig iron containing about 6 to 17% by weight of silicon, a minor amount not less than 0.0024% by weight of boron and the balance substantially iron and incidental impurities, comprising the steps of placing a charge of proper composition in a furnace, operating the furnace to produce molten silvery pig iron containing from about 6 to 17% silicon, withdrawing molten silvery pig iron and, in conjunction with any of the preceding steps, adding an oxygen-containing boron compound in a quantity to provide a minor amount not less than about 0.0024% by weight of boron in the silvery pig iron product.

22. The method of making silvery pig iron containing about 6 to 17% by weight of silicon, from about 0.0024 to 0.1% by weight of boron, and the balance substantially iron and incidental impurities, comprising the steps of placing a charge of proper composition in a furnace, operating the furnace to produce molten silvery pig iron containing from about 6 to 17% by weight of silicon, withdrawing molten silvery pig iron and, in conjunction with any of the preceding steps, adding an oxygen-containing boron compound in a quantity to provide from 0.0024 to 0.1% by weight of boron in the silvery pig iron product.

23. The method of making silvery pig iron containing about 6 to 17% by weight of silicon, from about 0.0024 to 0.1% by weight of boron, and the balance substantially iron and incidental impurities, comprising the steps of placing a charge of proper composition in a furnace, operating the furnace to produce molten silvery pig iron containing about 6 to 17% by weight of silicon, withdrawing molten silvery pig iron and, in conjunction with any of the preceding steps, adding a material comprising an oxygen-containing boron compound and a fluxing agent in a quantity to provide from about 0.0024 to 0.1% by weight of boron in the silvery pig iron product.

24. The method of making malleable pig iron containing about 1.25 to 2.25% by weight of silicon, a minor amount not less than about 0.0012% by weight of boron, and the balance substantially iron and incidental impurities, comprising the steps of placing a charge of proper composition in a furnace, operating the furnace to produce molten malleable pig iron containing about 1.25 to 2.25% by weight of silicon, withdrawing molten malleable pig iron and, in conjunction with any of the preceding steps, adding a material comprising an oxygen-containing boron compound and a fluxing agent in a quantity to provide a minor amount not less than 0.0012% by weight of boron in the malleable pig iron product.

25. The method of making malleable pig iron containing about 1.25 to 2.25% by weight of silicon, from about 0.0012 to 0.05% by weight of boron, and the balance substantially iron and incidental impurities, comprising the steps of placing a charge of proper composition in a furnace, operating the furnace to produce molten malleable pig iron containing from about 1.25 to 2.25% by weight of silicon, withdrawing molten malleable pig iron and, in conjunction with any of the preceding steps, adding an oxygen-containing boron compound in a quantity to provide about 0.0012 to 0.05% by weight of boron in the malleable pig iron product.

26. The method of making silvery pig iron containing about 6 to 17% by weight of silicon, a minor amount not less than about 0.0024% by weight of boron and the balance substantially iron and incidental impurities, comprising the steps of placing a charge of proper composition in a furnace, operating the furnace to produce molten silvery pig iron containing from about 6 to 17% by weight of silicon, withdrawing molten silvery pig iron and, in conjunction with any of the preceding steps, adding an oxygen- and boron-containing substance selected from the group consisting of Rasorite, $H_3BO_3$, $B_2O_3$, $Na_2B_2O_4$, $Na_2B_4O_7$, and hydrates thereof in a quantity to provide a minor amount not less than about 0.0024% by weight of boron in the silvery pig iron product.

27. The method of making silvery pig iron containing about 6 to 17% by weight of silicon, from about 0.0024 to 0.1% by weight of boron, and the balance substantially iron and incidental impurities, comprising the steps of placing a charge of proper composition in a furnace, operating the furnace to produce molten silvery pig iron containing from about 6 to 17% by weight of silicon, withdrawing molten silvery pig iron and, in conjunction with any of the preceding steps, adding an oxygen- and boron-containing substance selected from the group consisting of Rasorite, $H_3BO_3$, $B_2O_3$, $Na_2B_2O_4$, $Na_2B_4O_7$, and hydrates thereof in a quantity to provide from 0.0024 to 0.1% by weight of boron in the silvery pig iron product.

28. The method of making malleable pig iron containing about 1.25 to 2.25% by weight of silicon, a minor amount not less than about 0.0012% by weight of boron and the balance substantially iron and incidental impurities, comprising the steps of placing a charge of proper composition in a furnace, operating the furnace to produce molten malleable pig iron containing from about 1.25 to 2.25% by weight of silicon, withdrawing molten malleable pig iron and, in conjunction with any of the preceding steps, adding an oxygen- and boron-containing substance selected from the group consisting of Rasorite, $H_3BO_3$, $B_2O_3$, $Na_2B_2O_4$, $Na_2B_4O_7$, and hydrates thereof in a quantity to provide a minor amount not less than about 0.0012% by weight of boron in the malleable pig iron product.

29. The method of making malleable pig iron containing about 1.25 to 2.25% by weight of silicon, from about 0.0012 to 0.05% by weight of boron, and the balance substantially iron and incidental impurities, comprising the steps of placing a charge of proper composition in a furnace, operating the furnace to produce malleable pig iron containing from about 1.25 to 2.25% by weight of silicon, withdrawing molten malleable pig iron and, in conjunction with any of the preceding steps, adding an oxygen- and boron-containing substance selected from the group consisting of Rasorite, $H_3BO_3$, $B_2O_3$, $Na_2B_2O_4$, $Na_2B_4O_7$, and hydrates thereof in a quantity to provide from 0.0012 to 0.05% by weight of boron in the malleable pig iron product.

References Cited in the file of this patent

UNITED STATES PATENTS

| | | |
|---|---|---|
| 2,149,480 | Paschke et al. | Mar. 7, 1939 |
| 2,280,283 | Crafts | Apr. 21, 1942 |
| 2,455,954 | Smalley | Dec. 14, 1948 |
| 2,651,570 | Heine | Sept. 8, 1953 |
| 2,661,278 | Edwin | Dec. 1, 1953 |
| 2,778,732 | Aeberly et al. | Jan. 22, 1957 |